Oct. 23, 1934.　　　M. ROMAINE　　　1,978,373
MILLING MACHINE
Filed Dec. 2, 1931　　7 Sheets-Sheet 1

Inventor
MILLARD ROMAINE
By H. K. Parsons
Attorney

Oct. 23, 1934.    M. ROMAINE    1,978,373
MILLING MACHINE
Filed Dec. 2, 1931    7 Sheets-Sheet 4

Inventor
MILLARD ROMAINE
AHKParsons
Attorney

Oct. 23, 1934.  M. ROMAINE  1,978,373
MILLING MACHINE
Filed Dec. 2, 1931  7 Sheets-Sheet 5

Inventor
MILLARD ROMAINE
By AHKParsons
Attorney

Oct. 23, 1934.　　　　M. ROMAINE　　　　1,978,373
MILLING MACHINE
Filed Dec. 2, 1931　　　7 Sheets-Sheet 6

Inventor
MILLARD ROMAINE
By
A.H.K. Parsons
Attorney

Patented Oct. 23, 1934

1,978,373

UNITED STATES PATENT OFFICE 1,978,373

MILLING MACHINE

Millard Romaine, Cincinnati, Ohio, assignor to The Cincinnati Milling Machine Company, Cincinnati, Ohio, a corporation of Ohio Application December 2, 1931, Serial No. 578,527

16 Claims. (Cl. 90—15)

This invention relates to milling machines and more particularly to an improved type of rotary milling machine.

One of the principal objects of this invention is to provide a new and improved rotary milling machine of simplified construction and design which may be utilized for performing plain milling operations in continuous or intermittent cycles or for cam milling operations.

Another object of this invention is to provide an improved and compact transmission and control mechanism for a rotary table of a milling machine having a greater range of feed rates than hitherto possible, together with a rapid traverse transmission and reverser whereby the table may be rotated in clockwise or counter-clockwise directions at feed or rapid traverse rates.

A further object of this invention is to provide an improved rotary table milling machine having a saddle of improved construction including a depending support for completely housing the table transmission including its prime mover, thereby protecting it against chips or extraneous material eliminating the necessity of splined or sliding connections and facilitating lubrication of the parts.

An additional object of this invention is to provide improved dog trip stop plunger means which will automatically reset after tripping to permit immediate restoration of the plunger to power transmitting position without further preliminary movements.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like parts.

The machine comprises in general a base or bed member 10 having a rotary table 11 mounted upon a saddle 12 which are reciprocable as a unit on the bed. Power means have been provided for effecting rotation of the table at variable feed rates and at rapid traverse in either clockwise or counter-clockwise directions. The table may also be rotated in either direction manually.

Figure 1:
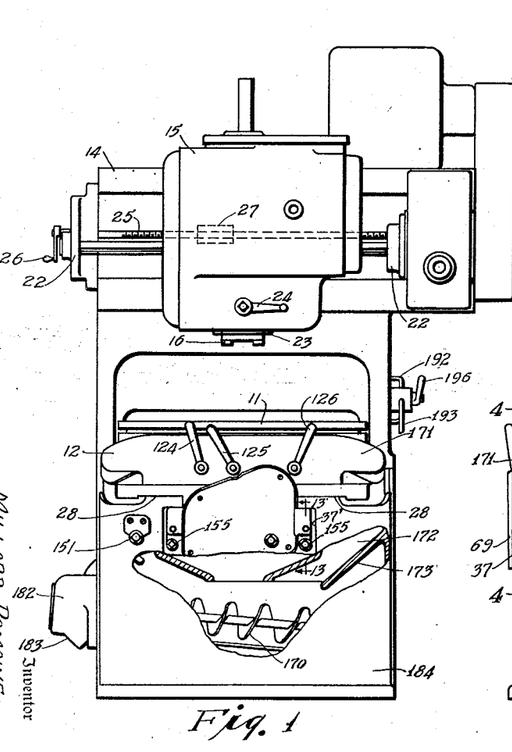
Figure 1 is a front elevation of a rotary table milling machine embodying the principles of this invention.
Figure 2:
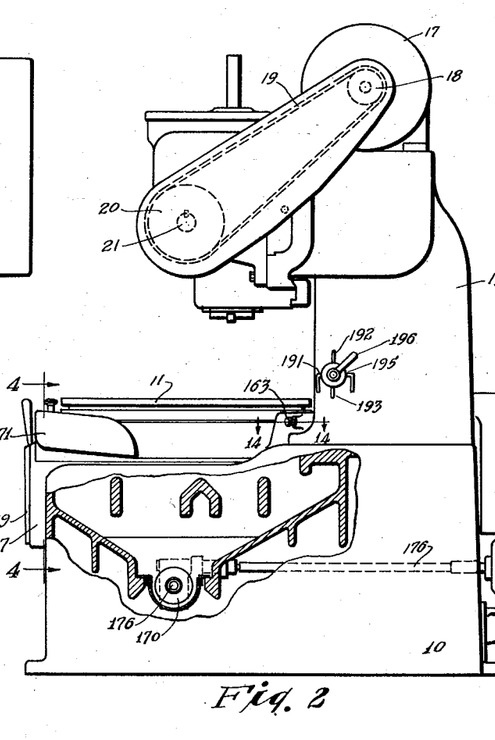
Figure 2 is a side elevation of the machine illustrated in Figure 1.

Suitable means have been provided for supporting a cutter or a plurality of cutters, in cooperative relation with the work table and one manner in which this may be accomplished is illustrated in Figures 1 and 2. As there shown, a column portion 13 integral with the bed is provided with a fixed rail 14 upon which is slidably mounted a spindle carrier 15. The spindle carrier is horizontally movable transversely of the saddle movement and has a spindle 16 which is axially adjustable toward and from the plane of the table, whereby adjustment between cutter and work in three different planes or directions is possible.

The cutter spindle 16 is adapted to be driven by a separate or independent prime mover such as an electric motor 17 which is mounted on the top of the column 13 and provided with a driving pulley 18 which through a power transmitting band 19 rotates a pulley 20 secured to the end of horizontal splined driving shaft 21. This shaft is journaled at opposite ends in suitable bearings 22 fixed to opposite ends of rail 14 and extends through the spindle carrier 15 having suitable gearing therein for rotating the spindle. The spindle is rotatably journaled in a quill 23 which is movable toward and from the table by suitable manual means including the lever 24 mounted on the exterior of the spindle carrier.

Lateral adjustment of the spindle carrier on the rail is obtained by means of a feed screw 25 which is journaled in suitable bearings at opposite ends in the rail 14. At one end of the rail the feed screw shaft is projected through the bearing and provided with a manual control lever 26. The feed screw is held against longitudinal adjustment and is threaded in a nut 27 fixed in the spindle carrier whereby rotation of the feed screw will effect lateral adjustment of the spindle, the direction of movement depending upon the direction of rotation of the lever 26.

Figure 18:
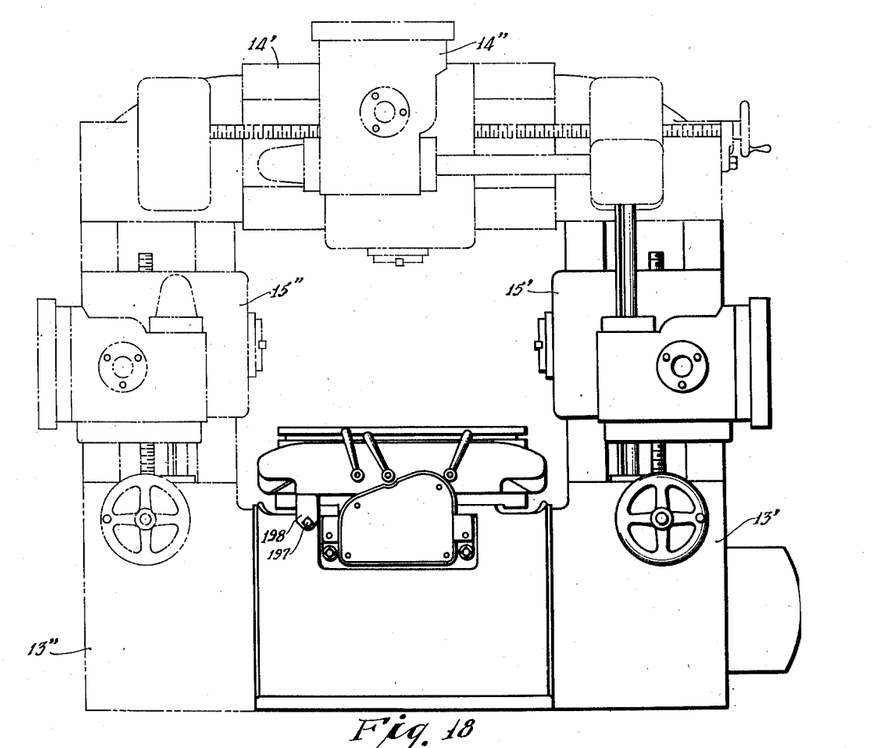
Figure 18 is a modified form of cutter supporting structure for the machine.

If so desired, the column 13 may be increased in width as shown at 13' in Figure 18 to provide vertical guideways for the mounting of a horizontal spindle carrier 15' whereby the axis of the cutter would be horizontal instead of vertical. For special work pieces necessitating the use of a large number of cutters, a second column 13" having a spindle carrier 15" may be provided upon the opposite side of the bed and if necessary a horizontal rail 14' may be provided for supporting a vertical spindle carrier 14" in addition to the horizontal carriers mounted on the two columns. In each of these illustrations, it will be apparent that the rotary cutter means is adjustable in three directions relative to the work carried by the rotary table.

From the foregoing it should now be apparent that the cutter spindle may be adjusted both laterally of the work table as well as axially toward and from the same.

Figure 3:
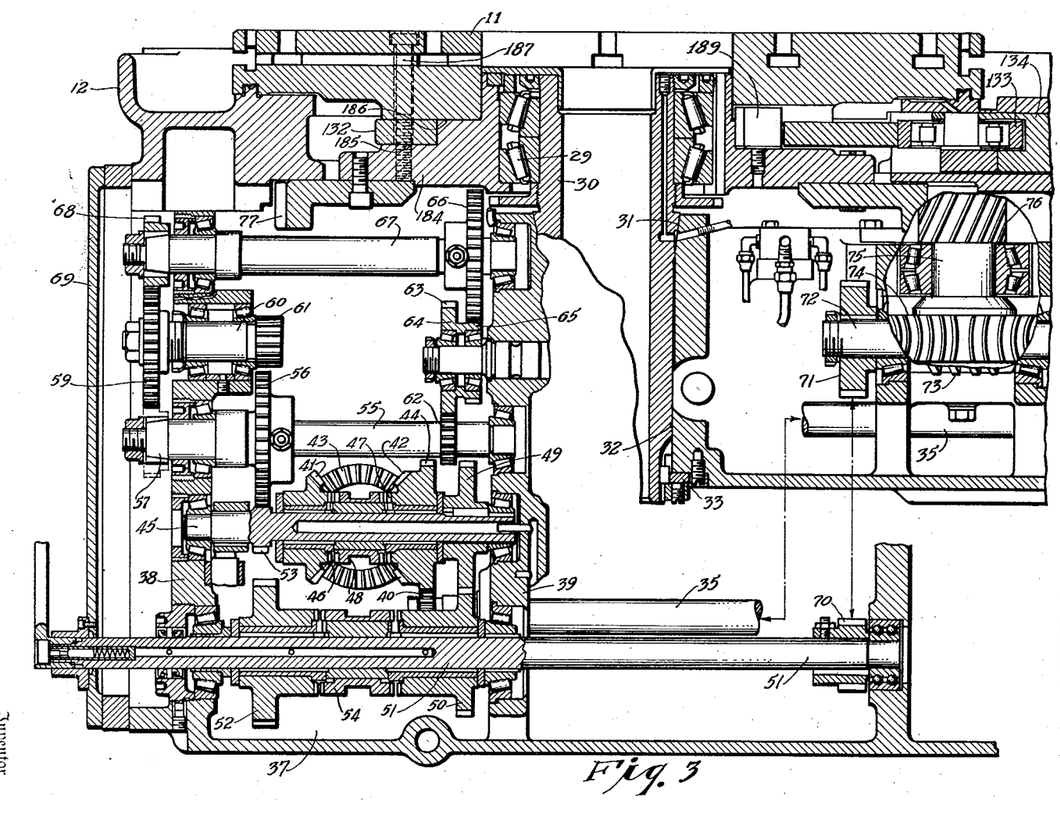
Figure 3 is an expanded view of the table transmission.

The saddle 12 is reciprocably mounted upon spaced longitudinal guide ways 28, formed upon the top of the bed 10. The table is rotatably mounted on the saddle in the following manner. A stationary pivot member 30, Figure 3, is mounted in a bore 32 in the saddle and held against axial movement by means of a tapered shoulder 31 engaging a tapered orifice formed at one end of the bore and a clamping ring 33 at the other end. A hub member 184 is journaled on anti-friction bearings 29 mounted on the upper end of the pivot member, for rotation by means of a ring gear 77 bolted to its lower peripheral edge. A hub is provided with an annular shoulder 185 for receiving a cam 132 when the device is utilized for profile milling work or for receiving spacers if the device is utilized for plain circular work. A second shoulder 186 is formed on the hub member for receiving the table 11 which is held in place by means of bolts 187, which also serve to clamp the cam or the spacer between the table and hub. A key member 189 serves as positive means to prevent relative movement between the parts during operation of the machine.

Figures 10, 11:
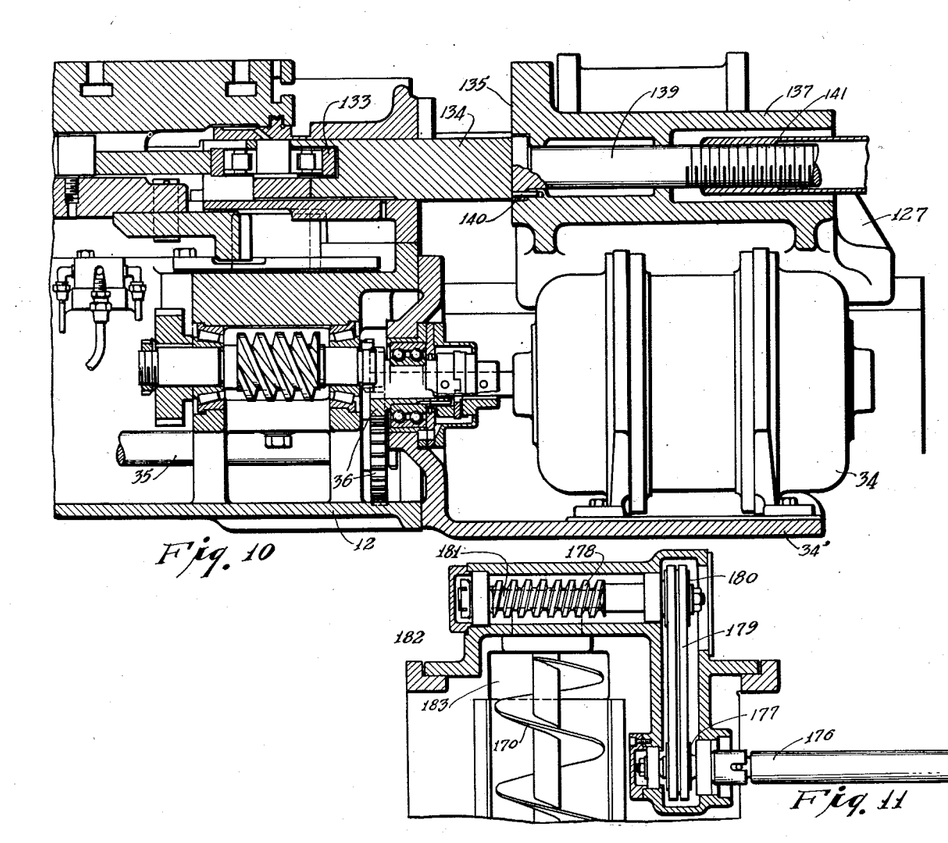
Figure 10 is a section on the line 10—10 of Figure 9.
Figure 11 is a detail of the chip conveyor drive.
Figure 12:
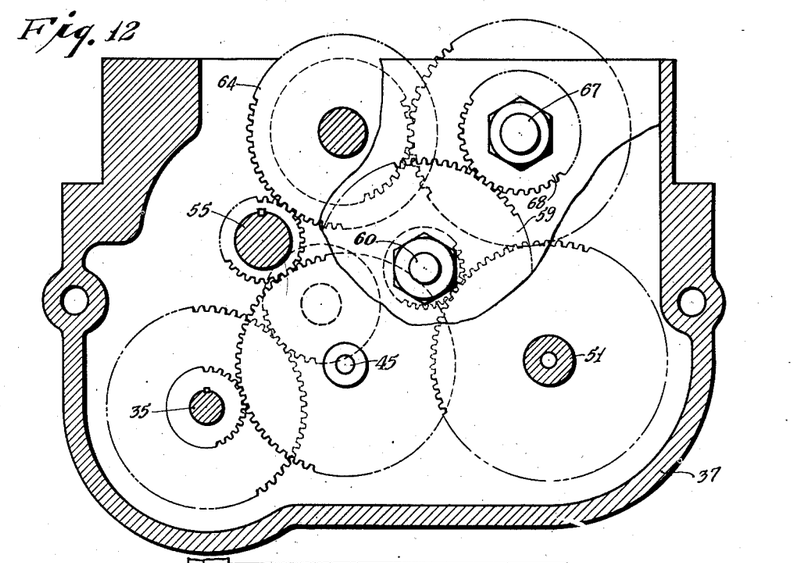
Figure 12 is a front view of the saddle with the cover plate removed showing the change gears.

The transmission of the table comprises a prime mover 34 mounted on a shelf 34' projecting from the rear end of the saddle for movement therewith, as shown in Figure 10, which drives shaft 35 through reduction gearing 36. As shown in Figure 3, this shaft extends forward to gear box or transmission housing 37, which depends from the underside of the saddle into a depression 37' formed in the top of the bed between the guides 28, and has two vertical walls 38 and 39, in one of which the forward end of shaft 35 is journaled. A gear 40 secured to the end of shaft 35 drives a pair of bevel gears 41 and 42, coupled together by an intermediate bevel gear 43, through a spur gear 44 formed integral with the gear 42. The bevel gears 41 and 42 are coaxially mounted on the shaft 45 for free rotation thereabout in opposite directions relative to each other and are provided with opposing clutch faces 46 and 47 respectively. A longitudinally shiftable clutch 48 is splined on the shaft 45 intermediate the gears 41 and 42 and provided with clutch teeth upon opposite ends thereof for engagement with the clutch face of one or the other of the bevel gears 41 and 42 for effecting the rotation of the shaft 45 in opposite directions.

A gear 49 is secured to one end of the shaft 45 in mesh with the rapid traverse gear 50 mounted for free rotation on the shaft 51. Opposed to the shaft 51 is a final feed gear 52 also mounted for free rotation on the shaft 51 and driven from a pinion 53 secured to the other end of the shaft 45 through a feed transmission described hereinafter. The opposed faces of the gears 51 and 52 are provided with clutch teeth for selective engagement by an intervening shiftable clutch member 54 splined on the shaft 51.

The feed transmission comprises a shaft 55 journaled for rotation in the walls 38 and 39 of the feed box parallel to the shaft 45 and having at one end a gear 56 meshing with the pinion 53. The shaft 55 is herein denoted as the high series shaft and is provided with a keyed portion 57 which projects beyond the wall 38 for receiving a change gear by which motion is transmitted to a suitable change gear 59 secured to the end of stub shaft 60 journaled in the wall 38 and provided on the interior end thereof with a pinion 61. The pinion 61 meshes directly with the feed gear 52 of the feed-rapid traverse clutch.

It will thus be seen that various change gears may be mounted on the ends of the shafts 55 and 60 for effective changes in the rate of rotation in the gear 61. The range of these rates will extend above and below the rate of rotation of the shaft 55 thereby providing a high series of feed rates.

A pinion 62 is secured to the opposite end of the shaft 55 in mesh with gear 63 of couplet 64, the second gear 65 of which meshes with the bull gear 66 secured to the end of the shaft 67 which is journaled in opposite walls of the gear box parallel to the high series shaft 55 but upon the opposite side of stub shaft 60. The shaft 67 is herein known as the low series shaft and has a pinion 68 secured to the projecting end thereof and meshed with gear 59 on the shaft 60. The gear 68 constitutes a change gear and therefore the gears 68 and 59 may be interchanged for effecting variations in the feed rate. If desired other pairs of change gears may be substituted therefor whereby the pinion 61 may be driven at a series of rates, the range of which will extend above and below the rate of rotation of the shaft 67. The construction and arrangement of parts is such that the highest feed rate that may be imparted to the shaft 60 by the shaft 67 is slightly below the lowest feed rate that may be imparted by the shaft 55 to the shaft 60 whereby the upper series of feed rates is a continuation of the lower series of feed rates and in proper geometrical progression therewith.

Furthermore the same set of change gears that are used between the low series shaft and the intermediate shaft for effecting the series of lower feed rates may also be utilized between the intermediate shaft and the high series shaft for effecting the series of higher feed rates. Thus one set only of change gears are utilized for effecting two different series of rates.

A cover plate 69 is secured to the front end of the saddle for protecting the change gears and providing easy access thereto. The final shaft 51 extends rearward from the saddle and is provided with a gear 70 on the end thereof meshing with a gear 71 secured to the end of stub shaft 72 which has a worm 73 keyed thereon, in engagement with a worm gear 74. The worm gear is fixed to a lower end of a vertical shaft 75 antifrictionally journaled in the saddle casting and provided on the upper end with a spiral gear 76 meshing with the spiral ring gear 77 secured to the under side of the table near the periphery thereof.

From the foregoing it will thus be seen that a transmission has been provided for the table comprising a feed transmission and a rapid traverse transmission terminating in final members 50 and 52 comprising a feed-rapid traverse clutch together with a reverser in the main line from the prime mover having a shiftable clutch member 48 whereby the rate and direction of movement of the table may be easily determined. Attention is invited to the compact arrangement of the feed transmission comprising a high and low series shaft mounted adjacent an intermediate shaft whereby the same set of change gears which are utilized between one of the series shafts and the intermediate shaft for obtaining one range of feed rates may also be utilized between the other series shaft and the intermediate shaft to obtain an extension of the previous range of feed rates. It will also be noted that these change gears are located at the front of the machine where they are easily accessible when feed rate changes are to be made.

From the foregoing description, it should also be apparent that the saddle, table, and transmission in the saddle for the table together with the prime mover constitute a self-contained unit which may be assembled with the machine as such, or removed from the machine as a unit for repair purposes.

Means have been provided for controlling the operation of the rate and direction determining clutches 54 and 48 respectively which are more particularly illustrated in Figures 4 to 7 inclusive. As is shown, the reverser clutch 48 is provided with a shifter fork 78 secured to a shift rod 79 having rack teeth 80 engaged by a pinion 81, the shifter fork engaging the annular groove in the clutch member 48 with a predetermined amount of lost motion. A vertical plunger 82 reciprocably mounted in the saddle is provided on the lower end with rack teeth 83 engaging the pinion 81 and at the upper end is provided with a disc shaped head 84 having a wedge shaped periphery 85. Suitable dogs 86 are provided for engaging the upper or lower faces of the periphery of the head whereby the plunger may be moved up or down to determine the direction of rotation of the table. To insure operation of the plunger, detent mechanism has been provided comprising the gear segment 87 engaging teeth 88 formed intermediate the ends of the plunger 82. The member 87 is provided with indents 88' separated by a peak 89 for engagement by a detent 90 pivotably mounted on the pin 91. Means similar to that shown in detent member 111 comprising a spring 92 mounted in a bore 93 in the end of the plunger actuates a pin 94 to maintain the detent in engagement with one or the other of the indents 88'. On reciprocation of the plunger the detent 90 will ride over the intervening peak 89 and thereby complete the movement initiated by the table dog.

Figures 4, 5, 6, 7, 16, 17:
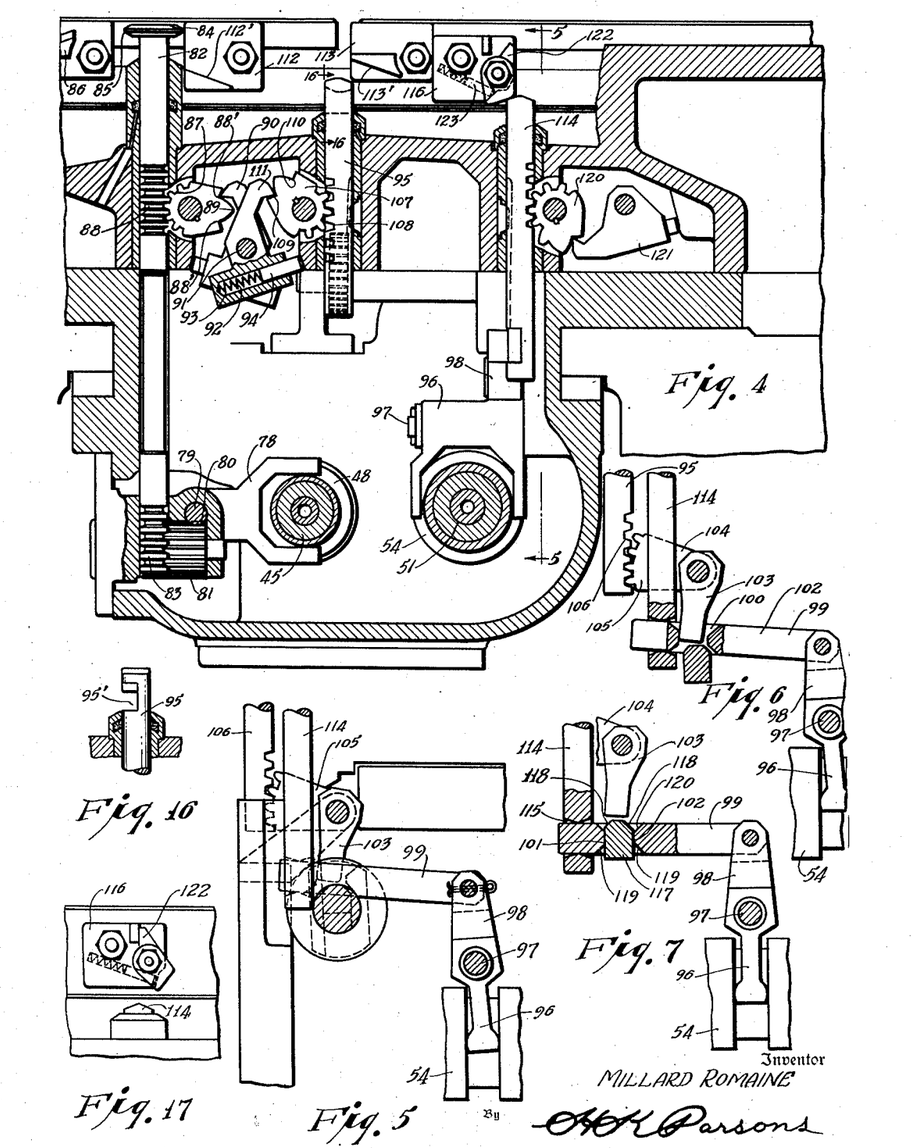
Figure 4 is a section as viewed on the line 4—4 of Figure 2.
Figure 5 is a detail on the line 5—5 of Figure 4.
Figures 6 and 7 are detailed views showing different positions of the stop plunger.
Figure 16 is a detail on the line 16—16 of Figure 4.
Figure 17 is a detail view showing the stop plunger in tripped position.
Figure 8:
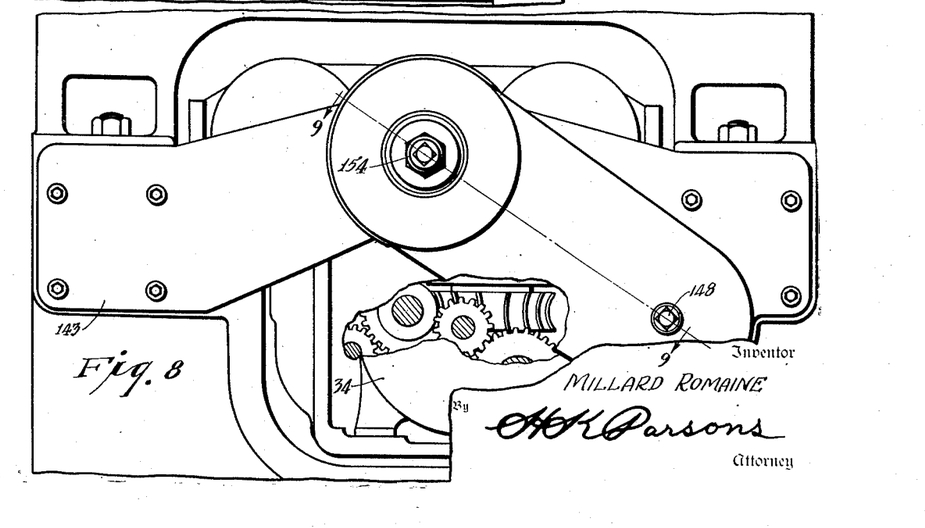
Figure 8 is a rear view of the machine partly in section.

A second plunger 95 is reciprocally mounted in the saddle for engagement by suitable dogs for operation of the feed-rapid traverse or rate determining clutch member 54. A shifter fork 96 is provided for this clutch and pivotably mounted on a pin 97 secured in the saddle housing. The fork has radial arm 98 to the end of which is pivotably connected a shifter rod 99. This shifter rod has formed therein a longitudinal slot 100 the end walls 101 and 102 of which are bevelled at the top and bottom. A radial arm 103 of the bell crank 104 projects into the longitudinal slot during engagement of the clutch, it being noted from Figures 5 and 6 that the end of the arm 103 is smaller than the width of the slot in member 99 thereby providing a certain amount of lost motion. The gear segment 105 forming the other arm of the bell crank 104 engages rack teeth 106 formed in the end of the plunger 95. The plunger 95 is also provided with load-and-fire mechanism comprising the rotatable gear segment 107 engaging teeth 108 formed in the plunger 95 and provided on its periphery with indents 109 and 110 for receiving the pivoted spring pressed detent 111. The result of this construction is that the plunger 95 will determine the rate of movement of the table and upon initiation of plunger movement by a table dog the detent will complete the movement. The plunger 95 is provided at the upper end thereof with a slot 95' cut in one side thereof as shown in Figure 16, the upper side of which slot is bevelled. The top of the plunger is similarly bevelled but in opposite directions. Dogs, such as 112 and 113, having wipe surfaces 112' and 113' respectively are secured to the table for engagement with the bevelled surfaces of the plunger for depressing or elevating the same.

It should therefore be apparent that dogs may be set around the periphery of the table for changing the rate of movement of the table from feed to rapid traverse or reverse thereby making it possible to perform intermittent milling on work carried by the table.

Means have also been provided for automatically stopping the table at any point in its cycle of movement and also manual means for re-engaging the clutch while in a stopped position without interference from the stop dog. To this end a third plunger 114 is reciprocally mounted in the saddle casting and provided on the lower end with a longitudinal slot 115, the upper and lower walls of which are bevelled outwardly. The previously mentioned shifter rod 102 is slidably mounted in this slot and when the plunger is in an upper position, it holds the shifter rod into engagement with the lower end of the crank arm 103 as shown in Figure 6. Upon depression of the plunger 114 by a stop dog such as 116, the shifter arm 102 is pivoted downward out of engagement with the crank arm 103 and into engagement with a fixed neutralizing member 117 which has bevelled wipe surfaces 118 formed on the upper side thereof, engaging the bevelled surfaces 119 formed on the end of walls 101 and 102, the position of the member 117 being such that the clutch 54 will be moved to a neutral position. Upward movement of the plunger 114 will cause the bevelled surfaces 120 to engage the lower end of the bell crank 103 and cause movement of the clutch 54 in the direction in which the bell crank is positioned. From this it will be seen that if the bell crank is in a feed position when the table stops and the bell crank is subsequently moved to a rapid traverse position, that the table will move at the rate determined by the new setting of the rate determining plunger. The plunger 114 has also been provided with a two-position detent mechanism comprising the rotatable member 120 and the spring pressed detent 121 whereby initiation of the upward or downward movement of the plunger 114 will be completed by the detent in the usual manner of such mechanism.

The stop dog 116 is constructed so as not to interfere with manual engagement of the rate determining clutch after it has been automatically depressed by the dog and without moving the table. The dog comprises a pivoted member 122 which normally assumes a position such as shown in Figure 17 and upon engagement with the end of the plunger is moved to the position shown in Figure 4 against the resistance of a spring pressed pin 123 which is reciprocally mounted in the dog. The dog is so formed that it will depress the plunger 114 to slightly beyond the half way point after which the detent mechanism will complete the downward movement causing the end of the plunger to move away from the end of the dog and permit the spring pressed pin 123 to swing the dog around to the position shown in Figure 17. It will be apparent that in that position the plunger 114 may be moved upward by means of manual control without any interference.

All of the trip plungers which have been described as dog operated are also susceptible of manual operation and the shafts upon which the members 87, 107 and 120 are mounted are extended through the front wall of the saddle and provided with manual operating levers 124, 125, and 126 respectively as shown in Figure 1.

The shaft 51 is also projected through the front wall of the machine and provided with a square head for receiving a detachable operating lever whereby, when the clutch 54 is in neutral position, the shaft 51 may be manually rotated to effect rotation of the table, it being recalled that the gears 50 and 52 are mounted for free rotation on this shaft and the transmission coupled therewith will not be rotated thereby upon manual rotation of the shaft. It is therefore possible to rotate the table manually as well as by power under automatic control.

As previously stated, this machine is suitable for cam cutting or profiling purposes as well as circular milling operations and for this reason an auxiliary saddle has been provided which is a self-contained unit in itself and is utilized with the main saddle when cam milling operations are to be performed. The auxiliary saddle 127 is slidably mounted upon the guideways 28 behind the main saddle 12 and is detachably connected therewith by a pair of piston rods 128 which have a headed end 129 fitting in sockets in the rear face of the saddle 12 for easy attachment and removal. The other ends of the piston rods are connected to pistons 130 reciprocably mounted in cylinders 131 mounted on the auxiliary saddle. When cam milling operations are to be performed the auxiliary saddle is mounted upon the guideways and connected to the main saddle. A profiled cam 132 having a contour similar to the work to be produced is attached to the underside of the table in the manner previously explained.

A cam roller 133 is anti-frictionally journaled in the end of a roller block 134 and engages the periphery of the cam 132. The block 134 is interposed between the front face 135 of the auxiliary saddle 127 and the periphery of the cam 132. It should therefore be apparent that if pressure is admitted into the cylinders 131 through ports 138 that the forward saddle would be pulled backward toward the rear saddle with the cam 132 pressing against the cam roller 133 which in turn would cause the block 134 to be forced into tight engagement with the face 135. By this arrangement the two parts may be held together but permitting relative movement of one with respect to the other against resistance of the pressure in the cylinders as when a rise on the cam 132 passes by roller 133.

Figure 9:
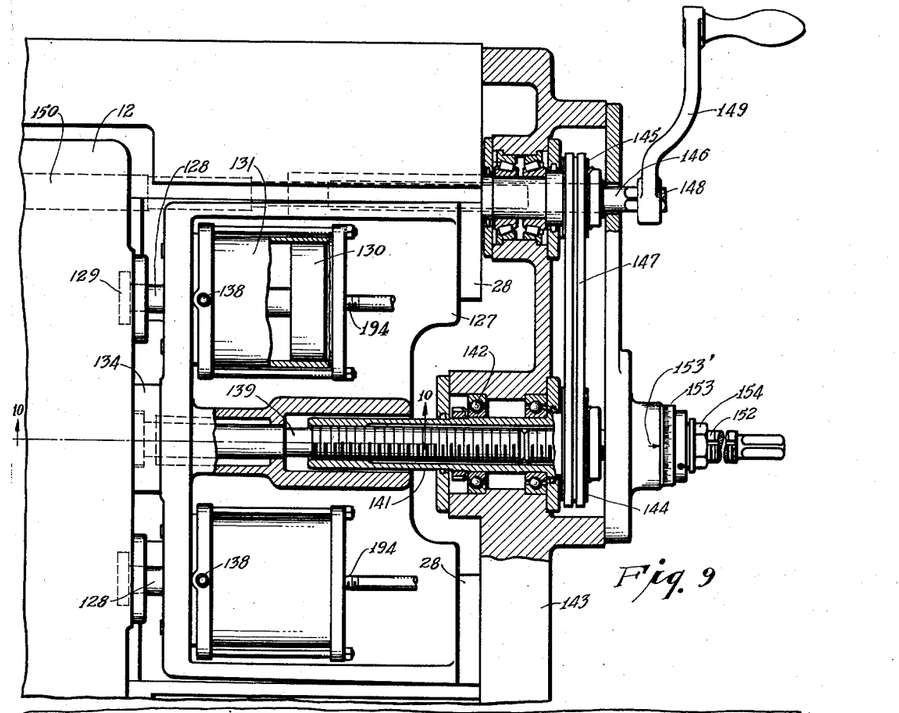
Figure 9 is a sectional view on the line 9—9 of Figure 8.

Means have been provided for adjusting the saddle longitudinally on its guide ways relative to the cutter and comprises a screw 139 fixed against rotation in the rear saddle member by a pin 140. The screw is threaded into a rotatable nut 141 which is journaled in anti-friction bearings 142, shown in Figure 9, mounted in cross bracket 143 secured to the end of the bed. The nut 141 has secured to the rear end thereof a pulley 144 which is driven from a pulley 145 on the shaft 146 through a belt or other suitable means 147. The shaft 146 has a square projecting end 148 for receiving a manual operating lever 149. The shaft 146 extends forward in splined telescoping connection with a shaft 150 which extends to the forward part of the machine and provided with a squared end 151 for receiving a lever. From this it will be seen that the nut 141 may be rotated from either the front or rear of the machine and thereby the saddle may be longitudinally adjusted relative to the cutter from either one of these positions.

The table upon movement into the cutter moves toward the rear of the machine and it is therefore apparent that in order to determine or control the depth of cut in cam milling that means must be provided for limiting the amount of this rearward movement. To this end an adjusting screw 152 is threaded in the cross bracket 143 into abutting engagement with the end of the screw 139 and a micrometer dial 153 is keyed on the screw for rotation relative to a fixed reference mark 153' provided for changing the adjustment of the screw 152 and thereby changing the extent of rearward movement of the table. A locking nut 154 is threaded on the screw 152 for locking the parts in adjusted position after making a change. The screw 152 therefore forms a fixed abutment which may be adjustable to vary the depth of cut.

When the machine is utilized for plain circular milling or surface milling operations, the pressure will be released from cylinders 131 rendering the feed screw 139 ineffective, in which case a feed screw 197 may be provided at the front of the machine as shown in Figure 18 which is supported from the saddle in a bracket 198 for movement therewith, the screw being threaded in a nut fixed with the bed.

As previously mentioned, the machine is adapted for performing continuous milling operations and in that event it may be desirable to clamp the saddle to the bed to add stability to the work supporting organization and to this end means have been provided for clamping the saddle at opposite ends to its guides.

Figure 13:
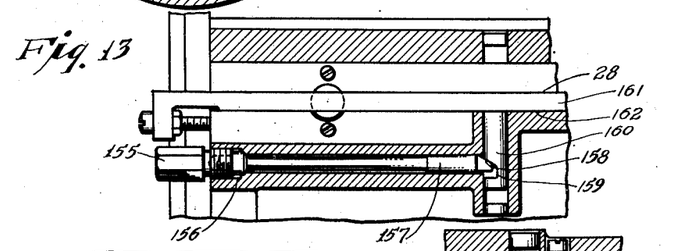
Figure 13 is a section showing a saddle clamp as viewed on the line 13—13 of Figure 1.
Figure 14:
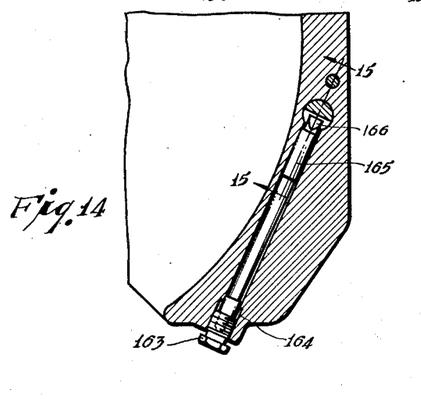
Figure 14 is a section showing the rear saddle clamp as viewed on the line 14—14 of Figure 2.
Figure 15:
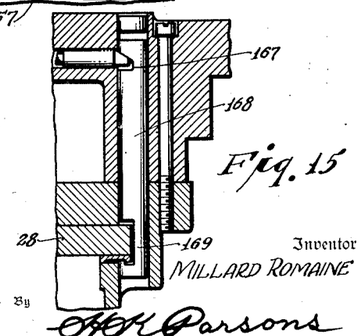
Figure 15 is a section on the line 15—15 of Figure 14.

As shown in Figure 13 a clamping bolt 155 is threaded in the end of a bore 156 formed in the bed in engagement with the end of a bolt or rod 157 reciprocably mounted in the bore having a wedge shaped end 158, engaging a socket 159 formed in a clamping plunger 160. The plunger engages the underside of a gib 161 which is adjustably interposed between the guide 28 and a bearing surface 162 formed on the underside of the saddle. Rotation of the clamping bolt 155 in a clockwise direction will cause longitudinal movement of the member 157 which by means of the wedge shaped end 158 will cause upward movement of the plunger 160 to effect clamping of the saddle to the bed. Two of these clamping bolts, 155, are provided upon opposite sides of the saddle as shown in Figure 1, and operable from the front of the machine. Additional means have been provided for clamping the saddle at the rear and comprise a second pair of clamping bolts 163 of which one is shown in Figure 14 and threaded in a bore 164 formed in the saddle casting and having a reciprocable rod 165 which has a wedge shaped end 166 engaging a socket 167 formed in the vertical clamping member 168.

This member has an elongated slot 169 which engages the underside of the guide to clamp the saddle down to the bed. Since the operation is similar to the one previously described, the description will not be repeated.

To prevent accumulation of chips in the bottom of the machine, power means have been provided for removing the chips therefrom and comprises a screw conveyor 170, Figures 1, 2 and 11 which is journaled under the saddle at opposite ends in the bed transversely, and at an incline whereby the chips in passing from the machine will be forced up the incline thereby preventing the removal of any considerable amount of coolant along with the chips. The saddle is provided with a peripheral flange 171 extending partially around the front and rear of the table but open at the sides of the machine, whereby chips and coolant will be conducted to the sides of the machine and disposed into longitudinal chambers 172 extending parallel to the bed and having deflectors 173 therein, for guiding the falling material to the conveyor.

The conveyor is adapted to be driven from a separate electric motor 174 supported by the bracket 175 at the rear of the machine. A shaft 176 is journaled in the bed in coaxial relation to the motor drive shaft and has secured to the other end a pulley 177 as shown in Figure 11, which rotates a worm 178 through belt 179 and pulley 180 keyed to the end of the worm shaft. The worm meshes with a worm gear 181 which is keyed to the end of the screw conveyor 170. By this means the chips may be removed from the machine at any time desired without interfering with the operation thereof. A casting 182 is secured to the side of the bed to form a receiver for the chips as they are removed from the machine and is provided with an opening 183 in the bottom thereof, whereby the chips will fall by gravity into a suitable container placed on the floor beside the machine. The coolant will drain from the conveyor through suitable apertures to a reservoir 184 in the base of the machine, from which it may be pumped by suitable means to the cutter for subsequent re-use.

A control valve 190 for the saddle cylinders is attached to the side of the column having an inlet 191 connected to a source of fluid pressure and outlets 192 and 193, the outlet 192 being connected to ports 138 of the cylinders 131 and the outlet 193 being connected to ports 194 of the cylinders. The valve has an exhaust port 195 whereby movement of the handle 196 to one position will connect ports 138 to pressure and ports 194 to exhaust and in the other position will reverse the connections.

Attention is invited to the construction of the table supporting mechanism whereby various cams having different profiles may be readily substituted for the one shown by simply removing the table clamping bolts and lifting the table off. This requires very little time thereby adding to the efficiency of the machine.

Figure 19:
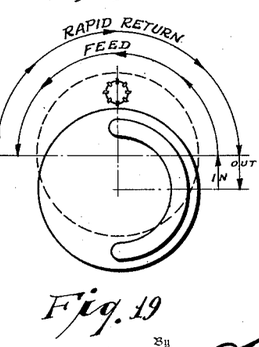
Figure 19 is a diagrammatic view showing one of the cycles of operation of which the machine is capable.
Figure 20:
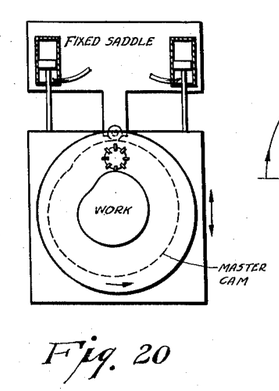
Figure 20 is a diagrammatic view showing a set up for a cam milling operation.

From the foregoing description it should now be apparent that a rotary table milling machine has been provided which is composed of a plurality of units including a bed unit, a main saddle unit having a rotary table mounted thereon, and a self-contained transmission together with a prime mover for actuating the table, a cutter supporting structure which may be selectively arranged to provide either horizontal or vertical cutter spindles; and an auxiliary saddle unit which may be detachably mounted on the bed and operatively connected with the main saddle for co-operation therewith in the performance of cam or profile milling operations as illustrated diagrammatically in Figure 20; and that suitable automatic control mechanism has been provided on the saddle for automatically controlling the rate and direction of movement of the table in its various possible cycles of operation, such as continuous, intermittent or other automatic cycles, one of which is illustrated diagrammatically in Figure 19 in which the table rotates in a counter-clockwise direction at a feed rate, returns in a clockwise direction at a rapid traverse rate and then automatically stopped, after which the saddle may be moved away from the cutter for the substitution of new work for the finished work. In addition to the plane milling and cam controlled milling operations, the machine is also adapted for boring and various other types of productive machine operations.

What is claimed is:

1. A machine tool having a bed, parallel guideways formed on the bed, a support member reciprocably mounted on the guideways comprising a main and auxiliary saddle, a work table rotatably mounted on the main saddle, a cutter spindle mounted for rotation in cooperative relation to the work table, positive means for positioning the auxiliary saddle relative to the spindle, means to maintain the main saddle in predetermined position relative to the auxiliary saddle during adjustment, and abutting means carried by the two saddles and effective upon the rotation of the table to reciprocate the main saddle and thereby the table relative to the cutter spindle.

2. A machine tool having a bed, parallel guideways formed on the bed, a support member reciprocably mounted on the guideways comprising a main and auxiliary saddle, a work table rotatably mounted on the main saddle, a cutter spindle mounted for rotation in cooperative relation to the work table, means operative from the front and rear of the machine for positioning the auxiliary saddle relative to the cutter, including a screw and nut, one of which is attached to the auxiliary saddle, and means to maintain the main saddle in contact with the auxiliary saddle during adjustment, and cam means effective upon rotation of the table to reciprocate the main saddle and thereby the table relative to the cutter spindle.

3. A machine tool having a bed, a support member reciprocably mounted thereon comprising a main and auxiliary saddle, a work table rotatably mounted on the main saddle, a rotating cutter, means operable from the front and rear of the machine for positioning the support member relative to the cutter, resilient means to maintain the main saddle in predetermined position relative to the auxiliary saddle during adjustment, and cam means effective upon rotation of the table to reciprocate the main saddle against the resistance of said resilient means to effect relative movement between the cutter and table.

4. A milling machine having a support, spaced parallel guideways formed thereon, a saddle reciprocably mounted on the guideways, a gear box depending from the saddle between said guideways, a work table rotatably mounted on the saddle, means to rotate the table including a prime mover mounted in the rear of the saddle, a feed transmission and a rapid traverse transmission mounted in said gear box, motion transmitting means coupling the transmissions to the prime mover including a reverser, said feed transmission including a high series feed shaft and a low series feed shaft in parallel driving relation, an intermediate shaft, a set of change gears for coupling the low series shaft with the intermediate shaft for rotation at a plurality of geometrically progressive rates, means for coupling the high series shaft with the intermediate shaft for rotation at a high series of geometrical progressive rates, said high series being a continuation of the low series in the same geometrically progressive order, a final drive shaft to the table, and means to selectively couple the intermediate shaft or the rapid traverse transmission to the final shaft to actuate the table at either feed or rapid traverse rates.

5. A milling machine having a support, spaced parallel guideways formed on said support, a saddle reciprocably mounted on the guideways, a gear box depending from the forward part of the saddle between said guideways, a table rotatably mounted on the saddle, means to rotate the table including a prime mover mounted on the rear of the saddle, a feed transmission and a rapid traverse transmission mounted in said gear box, motion transmitting means coupling the transmissions to the prime mover including a reverser, said transmission including a high series feed shaft and a low series feed shaft in parallel driving relationship, an intermediate shaft, a single set of change gears for coupling either the high series or low series shaft with an intermediate shaft, a final drive shaft to the table, means to selectively couple said intermediate shaft or said rapid traverse transmission to the final drive shaft for actuating the table at feed or rapid traverse rates and a removable cover plate on the gear box to effect access to the change gears.

6. A milling machine having a cutter, a rotary table, a prime mover, a rapid traverse transmission and a feed transmission, means coupling said transmissions with the prime mover, including a reverser clutch, said feed transmission comprising a high series and a low series feed shaft, an intermediate shaft, a single set of change gears for selectively coupling either of said shafts to the intermediate shaft, a final feed element actuated by said intermediate shaft, a final clutch element actuated by the rapid traverse transmission, a rate determining clutch interposed between said elements, trip plungers coupled with each clutch and trip dogs carried on the periphery of the table co-acting with said plungers to automatically determine the rate and direction of table rotation.

7. A milling machine having a cutter, a rotary table, a prime mover, a rapid traverse transmission, a feed transmission, means coupling both of said transmissions with the prime mover including a reverser clutch, said feed transmission comprising a high series and a low series shaft, an intermediate shaft, a single set of change gears for selectively coupling either of said shafts with the intermediate shaft for rotation at a plurality of feed rates, a final feed element actuated by the intermediate shaft, a final rapid traverse element actuated by the rapid traverse transmission, a rate determining clutch interposed between said elements, trip plungers coupled with each clutch, trip dogs carried by the table co-acting with said plungers to determine the rate and direction of table movement, an additional plunger coacting with said rate clutch to move the clutch to a neutral position and stop the table.

8. A milling machine having a cutter, a rotary table, a prime mover, a rapid traverse transmission, a feed transmission, means coupling said transmissions with the prime mover including a reverser clutch, said transmissions terminating in a final rapid traverse clutch element and a final feed clutch element respectively, a rate determining clutch interposed between said clutch elements, a clutch shifter member, means to actuate said member to selectively couple the table with said transmissions, a stop plunger, a fixed neutralizing member, trip dogs carried by the table for depressing said plunger, and means actuated by the plunger for moving the clutch shifter member out of operative engagement with its actuating means and into engagement with said neutralizing member to thereby stop the movement of the table.

9. A milling machine having a bed or support, spaced parallel guideways formed thereon, said support having a depression in its upper face between said guideways and below the plane thereof, a saddle reciprocably mounted in said guideways, a work table rotatably mounted on the saddle, a transmission housing depending from the underside of the saddle into said depression, a power transmission for the table mounted in said housing, a shelf projecting from the rear of the saddle, and a prime mover mounted on said shelf and operatively coupled to the transmission for effecting power rotation of the table.

10. A milling machine having a bed or support, spaced parallel guideways formed thereon and extending from the front of the machine to the rear, said support having a depression formed in its upper face between the guideways and extending below the plane thereof, a saddle reciprocably mounted on said guideways, a work table rotatably mounted on the saddle, a transmission housing depending from the saddle into said depression, a power transmission for rotating the table mounted in said housing including change gear mechanism, and a removable cover plate mounted on the forward side of said housing to effect access to said change gears.

11. A milling machine having a bed, spaced parallel guideways formed on the top of the bed and extending longitudinally thereof, a cutter support overlying said guideways, said bed having a depression formed in the top thereof between said guideways, a preassembled work support unit slidably mounted on the guideways including a saddle having guide surfaces thereon engaging said guideways, a work table rotatably mounted on the upper side of said saddle, a transmission housing attached to the lower side of said saddle between the guideways and depending into said depression, a power transmission for the table mounted in said housing, a prime mover carried by the saddle for actuating said transmission and means to adjust the saddle on said guideways to vary the relationship between cutter and work.

12. A milling machine having a bed, guideways formed on the top of the bed, a saddle reciprocably mounted on said guideways, a work table rotatably mounted on the saddle, means carried by the bed for journaling a cutter spindle therein, means to adjust the saddle and thereby the table longitudinally relative to the cutter to cause the path of the work to intersect the axis of the cutter, a positive stop for determining this position, and power actuated means carried by the saddle for rotating the table to cause successive work pieces carried thereby to be finished by the cutter including a prime mover, a transmission extending from the prime mover to the table including independent rate and direction determining means and control means for said transmission including separate trip plungers for each of said determining means, and differently positioned means carried by the table for actuating said plungers.

13. In a milling machine having a cutter support and a work support, the combination of a transmission for effecting relative movement between the supports including a prime mover, a rapid traverse transmission and a feed transmission coupled to the prime mover for actuation thereby, said feed transmission divided into two branches, one of which is driven at a higher rate than the other, a final output member, a common rate changer utilizable between either branch and said final output member for actuation thereof at one plurality of rates by one of said branches, or at a second and different plurality of rates by the other of said branches, and means to connect selectively the final output member or the rapid traverse transmission to one of said supports for effecting relative movement thereof with respect to the other support.

14. In a milling machine having a cutter support and a work support the combination of a transmission for effecting relative movement between the supports including a prime mover, three branch transmissions, one of which is coupled to the prime mover for constant actuation thereby at a rapid traverse rate, means coupling the other two transmissions in different ratios to the prime mover for actuation at relatively slower rates than the rapid traverse transmission, common rate change gears utilizable in either of the last two named branch transmissions for changing the output rate thereof and means for selectively coupling any one of said three transmissions to one of said supports for effecting relative movement thereof with respect to the other support.

15. In a milling machine having a cutter support and a work support the combination of a transmission for effecting relative movement between the supports including a prime mover, three parallel transmissions actuable by the prime mover including a rapid traverse transmission, a relatively high ratio feed transmission and a relatively low rate feed transmission, a common reverser for all of said transmissions and a common clutch for selectively connecting any one of the three transmissions to one of said supports for effecting relative movement thereof with respect to the other support.

16. A milling machine having a bed, a cutter spindle rotatably supported by the bed, guide ways formed on the bed beneath said cutter spindle, a main saddle member reciprocally mounted on said guide ways, a work table rotatably mounted on the main saddle, a power transmission carried by the saddle for effecting rotation of the table, an auxiliary saddle mounted on said guide ways, fluid operable means carried by the auxiliary saddle for effecting reciprocation of the main saddle and thereby movement of the work table to an operative or inoperative position with respect to the cutter, and means to adjust said auxiliary saddle to shift the range of movement of the table with respect to the cutter.

MILLARD ROMAINE.